United States Patent Office 3,686,095
Patented Aug. 22, 1972

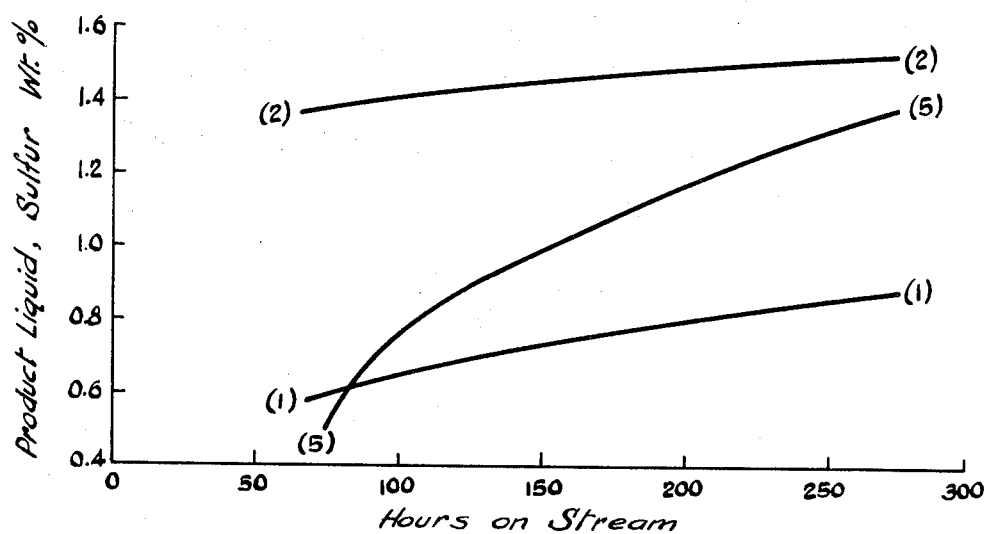

3,686,095
DESULFURIZATION OF RESIDUE-CONTAINING HYDROCARBON OILS
William R. Coons, Jr., Groves, and Gerald V. Nelson, Nederland, Tex., and Glenn C. Wray, Dyersburg, Tenn., assignors to Texaco Inc., New York, N.Y.
Continuation-in-part of application Ser. No. 689,825, Dec. 12, 1967. This application Feb. 16, 1970, Ser. No. 11,915
Int. Cl. C10g 23/02
U.S. Cl. 208—216                    9 Claims

ABSTRACT OF THE DISCLOSURE

Hydrodesulfurization of atmospheric residua or vacuum residua is carried out with a catalyst containing a compound of a Group VI metal and a compound of an iron group metal with a catalyst support of alumina, zirconia or magnesia containing 2–14% silica and having specified surface area, pore volume and average pore diameter.

---

This application is a continuation-in-part of our copending application Ser. No. 689,825, filed Dec. 12, 1967 and now abandoned.

This invention relates to the treatment of hydrocarbons. More particularly, it is concerned with the catalytic hydrodesulfurization of hydrocarbons, especially heavy hydrocarbon oils of the crude and residual types.

The hydrodesulfurization of hydrocarbon liquids is well known and has been practiced for several years in the refining of petroleum. The catalytic hydrodesulfurization processes of the prior art comprise contacting the sulfur-containing charge stock with a catalyst in the presence of hydrogen at elevated temperatures and pressures to convert the sulfur present in the charge stock to hydrogen sulfide. Ordinarily the hydrogen-rich effluent gas is subjected to a hydrogen sulfide removal treatment and recycled to the reaction zone. Typical catalysts comprise cobalt and molybdenum or nickel and molybdenum or nickel and tungsten on a support such as alumina.

Generally, sulfur is present in petroleum fractions in the form of mercaptans, sulfides, disulfides and in complex ring compounds containing ring structures such as thiophenes. In catalytic hydrodesulfurization of lighter fractions such as gasoline, naphtha and kerosine, the sulfur is present to a large extent in the form of easily-removable mercaptans which require less severe reaction conditions and thus longer catalyst life is obtained. However in residual fractions not only is the sulfur present in more difficultly removable form, but the fraction contains materials such as tar and metals which severely affect the activity of conventional catalysts.

The catalytic desulfurization of heavy hydrocarbon oil such as crudes and residuals has presented a particular problem to the petroleum refining industry in that to date commercial desulfurization of heavy hydrocarbon oils by known processes has not been practical. When heavy hydrocarbon oils, for example oils containing at least .1% by weight Conradson Carbon Residue, are contacted in a known manner, the catalysts become contaminated by deposited coke, metals and possibly "gum" (polymers) and require higher temperatures to effect satisfactory desulfurization. However, these higher temperatures lead to additional contaminant deposition which results in a rapid deactivation of the catalyst. This deactivation becomes progressively worse and to obtain satisfactory conversion it is necessary to increase the catalyst temperature still higher resulting in more coke and metal deposition thereby deactivating the catalyst to such an extent that commercial operation is no longer feasible within a relatively short time.

According to the present invention, there is provided a process for the catalytic hydrodesulfurization of hydrocarbon oils having a Conradson Carbon Residue of at least 1% by weight which comprises contacting such a charge stock at elevated temperatures and pressures in the presence of hydrogen with a supported catalyst comprising a compound of a Group VI metal and a compound of an iron group metal, the catalyst having a surface area of at least 250 m.$^2$/g., a pore volume of at least 0.6 cc./g., an average pore diameter of less than 100 A. and containing at least 2% silica by weight.

Although the process of this invention is considered broadly as hydrodesulfurization, it will be appreciated by those skilled in the art that other reactions such as hydrocracking, hydroisomerization, dealkylation, hydrogenation and the like also take place to a greater or lesser extent depending on the particular charge stock and reaction conditions.

The charge stocks used in the process of our invention are particularly heavy petroleum hydrocarbon fractions containing at least 1% by weight Conradson Carbon Residue such as whole crudes atmospheric reduced crudes, vacuum residua, deasphalted oils, tar sand oil, shale oil and the like. Typically these charges contain tar and metals both of which ordinarily would have a detrimental effect on the catalyst life and activity.

The reaction conditions may be varied depending on the amount of desulfurization desired and on the charge stock. Typical reaction conditions are temperatures of 600–900° F., preferably 650–850° F. The pressure may range between 500 and 3000 p.s.i.g., a preferred range being 1000–2000 p.s.i.g. Space velocities of 0.1–10.0 may be used although a space velocity of 0.3–1.5 is preferred. Hydrogen from any suitable source such as electrolytic hydrogen, hydrogen obtained from the partial combustion of a hydrocarbonaceous material followed by shift conversion and purification, or catalytic reformer by-product hydrogen and the like may be used. The hydrogen should have a purity of between 50 and 100% although hydrogen purities of 75–90 volume percent are preferred. The hydrogen is introduced into the reactor at a rate between 1,000 and 20,000 s.c.f.b., a preferred rate being 3,000–10,000 s.c.f.b.

The above conditions are typical for hydrodesulfurization where a minimum conversion of the charge stock to lighter boiling products is desired, as for example for the desulfurization of a fuel oil. However, more severe reaction conditions such as a temperature of 800–900° F., a pressure of 1800–3000 p.s.i.g., a space velocity of 0.25–1 and a hydrogen rate of 5,000–15,000 s.c.f. hydrogen may be used if it is desired to convert a considerable portion of the charge stock to lighter boiling materials.

The catalyst as pointed out above comprises a compound of a Group VI metal such as molybdenum or tungsten associated with a compound of an iron group metal such as cobalt or nickel. Ordinarily the catalyst is charged to the reactor in oxide form although it can be expected that some reduction and some sulfidation takes place during the course of the process so that, after being on stream for sometime the catalyst is probably a mixture of the metal, the metal sulfide and perhaps the oxide. If desired, the catalyst after being charged to the reactor but prior to the institution of the on stream period may be converted at least in part to the sulfide form for example by contact with a gas such as a mixture of hydrogen and a sulfiding agent, e.g. hydrogen sulfide, methyl mercaptan or carbon disulfide. The iron group metal may be present in an amount varying from 1 to 20% by weight of the total catalyst, preferably 2–10% and the Group VI metal may be present in an amount ranging from about 5–40%, preferably 7–20%.

The hydrogenating metal components are supported on a refractory inorganic oxide such as alumina, zirconia or magnesia associated with from about 2-30% silica. In a preferred embodiment the support is a mixture of alumina and silica.

The catalyst should have a surface area of at least 250 m.$^2$/g. preferably at least 300 m.$^2$/g. and a pore volume of at least 0.6 cc./g. The upper limit of the surface area and pore volume is governed by the hardness and ruggedness of the catalyst. As a practical matter, for commercial installations where the catalyst is used in units capable of processing several thousands barrels of charge per day, the surface area should not exceed about 800 m.$^2$/g. and the pore volume should not exceed about 1.0 cc./g. Good results have been obtained with catalysts having a surface area of 300-400 m.$^2$/g. and a pore volume of 0.6-0.8 cc./g.

The catalyst should, in addition, have an average pore diameter of less than 100 A. suitably between 50 and 95 A. As defined in "Advances in Catalysis and Related Subjects," volume IV, page 98 (Academic Press, 1952), the average pore radius is equal to $2V/A$ where V is the pore volume and A is the surface area. The average pore diameter is of course $4V/A$ and is expressed in angstrom units.

The catalyst may be in the form of pellets or spheres having a maximum cross-sectional dimension of 1/16 to 1/2 inch and preferably is in the form of a fixed bed. The oil flow may be upward or downward through the bed co-current with the hydrogen flow or may be downward countercurrent to an upward hydrogen flow.

The catalyst may be prepared by any of the methods well known in the art such as by impregnating the support with a solution of a salt of one of the metals, filtering, drying and then impregnating with a solution of a salt of the other metal, filtering, drying and calcining in a manner well known in the art. Advantageously the support prior to the impregnation has a surface area and pore volume slightly in excess of the desired properties of the finished catalyst as the surface area and pore volume are to some extent reduced during the preparation of the catalyst.

The accompanying drawing shows graphically comparative results obtained by using the process of our invention and by the use of catalysts which do not have the requisite properties.

The following examples in which oil and hydrogen flow downwardly through a fixed bed of catalyst pellets are presented for illustrative purposes only and are not to be construed as limitations on the invention.

In the examples the following catalyst preparations are used.

|  | Catalyst No. | | | | |
| --- | --- | --- | --- | --- | --- |
|  | 1 | 2 | 3 | 4 | 5 |
| Surface area, m.$^2$/g. | 349 | 161 | 312 | 260 | 184 |
| Pore volume, cc./g. | 0.72 | 0.60 | 0.66 | 0.55 | 0.76 |
| Average pore diameter (4V/A) | 82.5 | 149 | 84.6 | 84.6 | 165 |
| Bulk density, lb./ft.$^3$ | 33.0 | 39.9 | 44.0 | 35.1 | 35.3 |
| Composition, wt. percent: |  |  |  |  |  |
| Co |  |  |  | 2.1 | 2.5 |
| Ni | 2.8 | 2.7 |  |  | 5.8 |
| Mo | 9.9 | 9.6 | 11.0 | 10.0 |  |
| W |  |  |  |  | 10.8 |
| Silica | 14.0 | Trace | 2 | Trace | 15 |
| Alumina | (1) | (1) | (1) | (1) | (1) |

[1] Balance.

EXAMPLE I

In this example the charge stock is a gas oil tower bottoms fraction derived primarily from Arabian crude and having the following characteristics:

Gravity ° API _____ 14.0
Sulfur, wt. percent _____ 2.8
Viscosity, SUS at 210° F. _____ 230
Conradson Carbon Residue, wt. percent ___ 11.1

Metals, p.p.m.:
  Ni _____ 16
  V _____ 72
  Fe _____ 5

The catalyst, operating conditions and other data appear below in Table I.

TABLE I

|  | Catalyst No. | | |
| --- | --- | --- | --- |
|  | 1 | 2 | 5 |
| Operating conditions: |  |  |  |
| Catalyst bed temp., ° F | 775 | 775 | 775 |
| H$_2$ partial pressure, p.s.i.a. | 1,500 | 1,500 | 1,500 |
| Space velocity, Vo/hr./Vc | 0.5 | 0.5 | 0.5 |
| Reactor feed gas rate, s.c.f./bbl. | 8,000 | 8,000 | 8,000 |
| Purity, vol. percent H$_2$ | 90 | 90 | 90 |
| Catalyst age, hours | 240 | 240 | 240 |
| Product liquid: |  |  |  |
| Gravity, ° API | 22.0 | 20.7 | 20.5 |
| Sulfur, wt. percent | 0.85 | 1.52 | 1.3 |
| Metals, p.p.m.: |  |  |  |
| Ni | 12.2 | 12.5 | 16.0 |
| V | 34.9 | 51.6 | 38.8 |
| Fe | <1 | <1 | <1 |
| Metals on catalyst: |  |  |  |
| G./g. catalyst | 1.02 (10$^{-2}$) | 0.57 (10$^{-2}$) | 0.79 (10$^{-2}$) |
| G./cc. catalyst | 0.54 (10$^{-2}$) | 0.34 (10$^{-2}$) | 0.45 (10$^{-2}$) |

These data show that the process of the invention as exemplified by catalyst No. 1 gives greater desulfurization than the processes of the prior art under identical operating conditions. The data also show, from the amount of metal deposited on the catalyst, a greater demetalization of the liquid product and additionally show that despite the greater deposition of metal on catalyst No. 1, it still has greater desulfurization activity than do the conventional catalysts. The differences are shown dramatically in the accompanying drawing which illustrates that in the process of the present invention the catalyst has good initial hydrodesulfurization activity and deactivates slowly whereas catalyst No. 5 which has 15% silica and 0.76 cc./g. pore volume but does not have the required surface area and average pore diameter has good activity but deactivates rapidly. Catalyst No. 2 has only one of the requisites of our invention and shows poor activity throughout the run.

EXAMPLE II

In this example the charge stock is a vaccum tower bottoms fraction from Arabian crude and has the following characteristics:

Gravity ° API _____ 9.4
Sulfur wt. percent _____ 3.8
Viscosity, SUS at 210° F. _____ 2740
Conradson Carbon Residue, wt. percent ___ 19.8
Metals, p.p.m.:
  Ni _____ 53
  V _____ 93
  Fe _____ 10

The catalyst operating conditions and other data are tabulated below in Table II.

TABLE II

|  | Catalyst No. | | |
| --- | --- | --- | --- |
|  | 3 | 3 | 4 |
| Operating conditions: |  |  |  |
| Catalyst bed temp., ° F | 664 | 725 | 725 |
| H$_2$ partial pressure, p.s.i.a. | 1,800 | 1,800 | 1,800 |
| Space velocity, Vo/hr./Vc | 0.5 | 0.5 | 0.5 |
| Reactor feed gas rate, s.c.f./bbl. | 10,000 | 10,000 | 10,000 |
| Purity, vol. percent H$_2$ | 90 | 90 | 90 |
| Catalyst age, hours | 184 | 420 | 194 |
| Product liquid: |  |  |  |
| Gravity, ° API | 12.7 | 13.1 | 13.8 |
| Sulfur, wt. percent | 2.3 | 1.4 | 2.3 |
| Metals, p.p.m.: |  |  |  |
| Ni | 34.1 | 27.2 | 25.0 |
| V | 43.1 | 33.8 | 63.0 |
| Fe | <1 | <1 | <1 |
| Metals on catalyst: |  |  |  |
| G./g. catalyst | 1.09 (10$^{-2}$) | 3.10 (10$^{-2}$) | 0.88 (10$^{-2}$) |
| G./cc. catalyst | 0.72 (10$^{-2}$) | 1.99 (10$^{-2}$) | 0.58 (10$^{-2}$) |

These data show the superiority of catalyst No. 3 using the catalyst bed temperature as a measure of severity.

It will be noted that the same degree of desulfurization can be obtained with catalyst No. 3 at 664° F. as with the prior art catalyst at 725° F. thereby permitting greater desulfurization at lower temperatures for longer catalyst life and lower hydrogen consumption. They also show that at the same temperature catalyst No. 3 produces a product sulfur content almost half that produced by catalyst No. 4 despite the fact that catalyst No. 3 has been on-stream more than twice as long as catalyst No. 4. It is significant that catalyst No. 4 although it has a surface area of 260 m.$^2$/g. and an average pore diameter of 84.6 A. does not have the other requisites of the catalyst of our process and gives greatly inferior results.

EXAMPLE III

In this example the charge is an atmospheric tower bottoms fraction with Arabian crude having the following characteristics:

Gravity, ° API _____ 21.5
Sulfur, wt. percent _____ 2.6
Viscosity, SUS at 210° F. _____ 55.6
Conradson Carbon Residue, wt. percent _____ 7.1
Metals, p.p.m.:
  Ni _____ 9
  V _____ 35
  Fe _____ 5

The catalyst, operating conditions and other data appear below in Table III.

TABLE III

| | Catalyst No. | |
|---|---|---|
| | 3 | 1 |
| Operating conditions: | | |
| Catalyst bed temp., ° F_____ | 775 | 775 |
| H$_2$ partial pressure, p.s.i.a._____ | 1,500 | 1,500 |
| Space velocity, Vo/hr./Vc_____ | 0.5 | 0.5 |
| Reactor feed gas rate, s.c.f./bbl_____ | 10,000 | 10,000 |
| Purity, vol. percent H$_2$_____ | 86 | 86 |
| Catalyst age, hours_____ | 480 | 480 |
| Product liquid: | | |
| Gravity, ° API_____ | 29.6 | 28.8 |
| Sulfur, wt. percent_____ | 0.31 | 0.35 |

These data show the substantial equivalence of nickel and cobalt on the catalyst and also show that the catalyst is still quite active effecting about 87% desulfurization even after an on stream period of 480 hours.

EXAMPLE IV

In this example the charge stock is a naphtha fraction having the following characteristics:

Gravity, ° API _____ 44.2
ASTM distillation range, ° F. _____ 220–432
Sulfur, wt. percent _____ 0.48

Catalyst, operating conditions and data appear below in Table IV.

TABLE IV

| | Catalyst No. | |
|---|---|---|
| | 1 | 2 |
| Operating conditions: | | |
| Catalyst bed temp., ° F_____ | 650 | 650 |
| Hydrogen partial pressure, p.s.i.a._____ | 650 | 650 |
| Space velocity, Vo/hr./Vc_____ | 5.0 | 5.0 |
| Reactor feed gas rate, s.c.f./bbl_____ | 2,100 | 2,100 |
| Catalyst age, hours_____ | 200 | 200 |
| Sulfur reduction, weight percent_____ | 92.1 | 91.7 |

After 200 hours on stream catalyst No. 1 shows a desulfurization of 92.1% and catalyst No. 2 a desulfurization of 91.7%. These data show that, strangely enough, although the catalyst used in the process of the present invention has vastly superior desulfurization activity for the treatment of heavy hydrocarbon oils, its desulfurization activity for lighter distillate stocks is essentially the same as catalysts used in conventional desulfurization processes.

The foregoing examples show that for the desulfurization of residue-containing charge stocks only catalysts Nos. 1 and 3, exemplary of the present invention, are satisfactory. Catalyst No. 2 has barely the requisite pore volume but insufficient surface area or silica and too high an average pore diameter, catalyst No. 4 has the requisite surface area and average pore diameter but insufficient pore volume and silica, catalyst No. 5 has sufficient silica and pore volume but insufficient surface area and too high an average pore diameter and all three show unsatisfactory residual oil desulfurization activity. Only catalysts Nos. 1 and 3 which have surface areas of at least 250 m.$^2$/g., pore volumes of at least 0.6 cc./g., average pore diameters between 50 and 95 A. and a silica content of at least 2% by weight are satisfactory.

We claim:

1. A process for the desulfurization of a petroleum hydrocarbon fraction having a Conradson Carbon Residue of at least 1% by weight selected from the group consisting of atmospheric residua and vacuum residua which comprises contacting said fraction at elevated temperature and pressure in the presence of hydrogen with a catalyst comprising a compound of a Group VI metal and a compound of an iron group metal on a support selected from the group consisting of alumina, zirconia and magnesia, said catalyst having a surface area of 250 m.$^2$/g. to 800 m.$^2$/g., a pore volume of 0.6 cc./g. to 0.8 cc./g., an average pore diameter of 50 A. to 95 A. and a silica content of 2% to 14% by weight of the catalyst composite.

2. The process of claim 1 in which the catalyst comprises compounds of nickel and molybdenum.

3. The process of claim 1 in which the catalyst comprises compounds of cobalt and molybdenum.

4. The process of claim 1 in which the catalyst comprises compounds of nickel and tungsten.

5. The process of claim 1 in which the process period extends for at least 400 hours.

6. The process of claim 1 in which the surface area of the catalyst is between 300 and 400 m.$^2$/g.

7. The process of claim 1 in which the catalyst is in the form of a fixed bed.

8. The process of claim 1 in which the hydrocarbon charge stock contains at least about 50 p.p.m. metals by weight.

9. The process of claim 1 in which the temperature is between 600° F. and 900° F. and the pressure is between 500 p.s.i.g. and 3000 p.s.i.g.

References Cited

UNITED STATES PATENTS 3,262,874  7/1966  Gatsis _____ 208—216
3,531,398  9/1970  Adams et al. _____ 208—216
3,425,934  2/1969  Jacobson et al. _____ 208—216
3,152,981  10/1964 Berlin et al. _____ 208—216

DELBERT E. GANTZ, Primary Examiner

G. J. CRASANAKIS, Assistant Examiner